No. 726,392. PATENTED APR. 28, 1903.
T. O. BAILEY.
CUTTING APPARATUS FOR MOWERS, &c.
APPLICATION FILED JAN. 14, 1902.
NO MODEL. 2 SHEETS—SHEET 1.
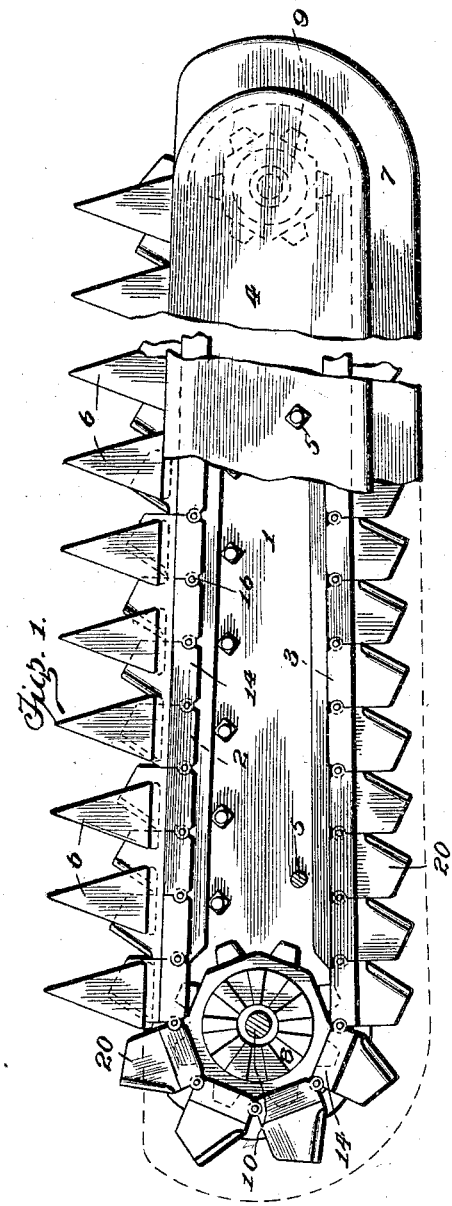
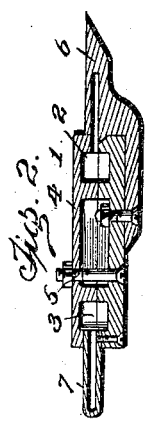
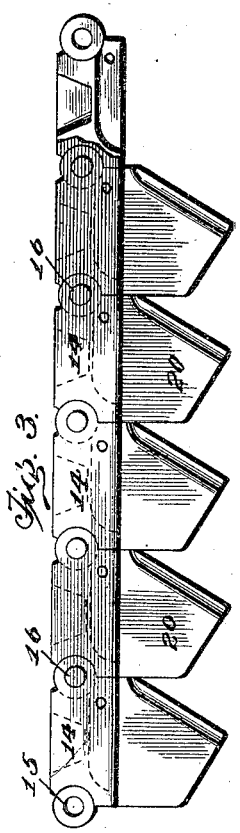
Witnesses
L. G. Handy
Sarah V. Lockwood
Inventor
Theodore O. Bailey
By Henry N. Capp
Attorney No. 726,392. PATENTED APR. 28, 1903.
T. O. BAILEY.
CUTTING APPARATUS FOR MOWERS, &c.
APPLICATION FILED JAN. 14, 1902.
NO MODEL. 2 SHEETS—SHEET 2.
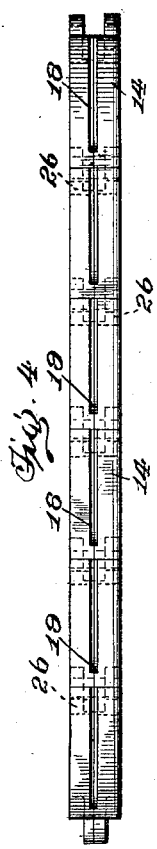
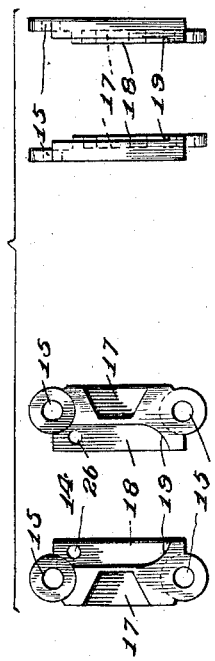
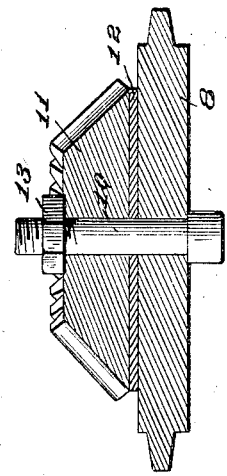
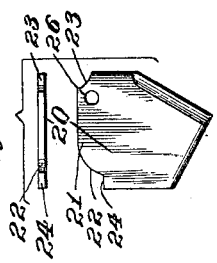
Witnesses
Le. G. Handy
Sarah V. Lockwood
Inventor
Theodore O. Bailey
By Henry N. Copp
Attorney

UNITED STATES PATENT OFFICE.

THEODORE O. BAILEY, OF NELLIE, CALIFORNIA.

CUTTING APPARATUS FOR MOWERS, &c.

SPECIFICATION forming part of Letters Patent No. 726,392, dated April 28, 1903.

Application filed January 14, 1902. Serial No. 89,738. (No model.)

*To all whom it may concern:*

Be it known that I, THEODORE O. BAILEY, a citizen of the United States, residing at Nellie, county of San Diego, and State of California, have invented certain new and useful Improvements in Cutting Attachments for Mowers and Like Machinery, of which the following is a specification.

My invention relates to cutting attachments for mowers, reapers, headers, and other machines employing a sickle.

The objects of the invention are the provision of an improved cutting attachment of the endless-chain type which will give to the cutters or knives great rigidity and prevent wabbling or twisting when in operation and also permit removal of the knives or mowers when injured or for sharpening, and, further, to provide improved means whereby the chance of the knives being injured or the chain carrying them being damaged or broken when arrested by sudden contact with a hard or immovable substance will be reduced to a minimum.

Having the foregoing and other not specifically enumerated objects in view, the invention consists of certain improved features and novel combinations of parts set forth in detail hereinafter and recited in the appended claims.

In the accompanying drawings, Figure 1 is a plan view of the cutting attachment with the greater portion of the cover broken away to illustrate the relative positions of the case and chain of cutters; Fig. 2, a transverse section of the case and fingers; Figs. 3, 4, 5, and 6, details of the chain and cutting-blades, and Fig. 7 a detail of the driving connection.

The numeral 1 designates the case, which is provided with the guideways 2 and 3 for the endless chain carrying the cutters to travel in, said case having the removable top 4, connected thereto at suitable points by bolts 5, while 6 are the fingers, and 7 is the guard for the knives to travel through on the return movement. At the ends of the case are the power-sprocket 8 and the idle sprocket 9. The power-sprocket is loosely mounted on a spindle 10, and the bevel-gear 11 for driving the sprocket 8 and the chain of cutters and the sprocket 9 are also loosely mounted on the spindle 10, while between the bevel-gear and the power-sprocket 8 is interposed a leather or rubber washer 12, and a nut 13 on spindle 10 and bearing on gear 11 affords means for adjusting the friction contact between the gear and the sprocket-wheel through the intervention of the leather or rubber washer 12. In consequence of this construction should the chain of cutters be suddenly stopped by contact with a hard or immovable substance the gear will slip on the washer and the chain and knives will not be injured.

The chain consists of the links 14, having eyes 15 at their ends, adapted to dovetail and held by the usual pins 16. These links have the sockets 17 on one side of each to receive the teeth of the sprockets, while on the opposite side they are provided with the recess 18, open at one end and terminating in the curve 19 at the other end. These links are formed in halves, as illustrated in Fig. 5, which is a convenient and advantageous construction and facilitates the manufacture thereof and the holding of the cutters, which are shown at 20, said cutters having the portion 21, adapted to fit in the recess 18 and curved at 22 and 23 to conform to the outlines of the recess and having a shoulder 24 to lap over the links and constitute an abutment to resist the pressure occasioned during the cutting operation. The cutters are secured by rivets 25, extending through the apertures 26 in the links and the blade.

The links together constitute an endless chain which is adapted to travel in the guideways 2 and 3, while the blades upon the return movement pass through the guard 7 and on the advance movement through the fingers 6. The confinement of the chain in the guideways 2 and 3 absolutely prevents any turning or twisting thereof, thus giving a practically rigid chain to sustain the pressure of the knives during the cutting operation.

Having thus described my invention, what I claim as new, and desire to secure by Letters Patent, is—

1. In a device of the class described, an endless chain composed of links each having a recess made inwardly from one side for only a portion of the distance across the face of the link, in combination with blades or cutters having a portion entering the recess and secured therein with the edges of the cutters abutting the rear walls of the recess and another portion overlapping the sides or edges of the links and forming an abutment or shoulder to resist the pressure on the blades during the cutting operation.

2. In a device of the class described, the herein-described links for the endless chain, comprising separable parts or halves having eyes at the ends, a socket on one side to receive the tooth of the sprocket-wheel and a knife or blade recess on the other side which is open at one end and closed at the other end.

In testimony whereof I hereunto affix my signature in presence of two witnesses.

THEODORE O. BAILEY.

Witnesses:
WM. H. FRANCIS,
A. D. DUM.